(12) United States Patent
Kobayashi

(10) Patent No.: US 9,979,251 B2
(45) Date of Patent: May 22, 2018

(54) SUBSTRATE MANUFACTURED FROM SHEET METAL AND RESIN, MOTOR PROVIDED WITH SUBSTRATE, AND SOLDERING METHOD THEREFOR

(71) Applicant: FANUC CORPORATION, Yamanashi (JP)

(72) Inventor: Kouji Kobayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 281 days.

(21) Appl. No.: 15/057,553

(22) Filed: Mar. 1, 2016

(65) Prior Publication Data

US 2016/0261160 A1 Sep. 8, 2016

(30) Foreign Application Priority Data

Mar. 3, 2015 (JP) .................................. 2015/041792

(51) Int. Cl.
| | |
|---|---|
| *H02K 3/50* | (2006.01) |
| *B23K 1/00* | (2006.01) |
| *B23K 1/005* | (2006.01) |
| *B23K 3/02* | (2006.01) |
| *B23K 101/32* | (2006.01) |
| *B23K 101/38* | (2006.01) |

(52) U.S. Cl.
CPC ............. *H02K 3/50* (2013.01); *B23K 1/0008* (2013.01); *B23K 1/0016* (2013.01); *B23K 1/0056* (2013.01); *B23K 3/02* (2013.01); *B23K 2201/32* (2013.01); *B23K 2201/38* (2013.01)

(58) Field of Classification Search
CPC .. B23K 1/0016; B23K 1/0008; B23K 1/0056; B23K 3/02; B23K 1/00; B23K 1/005; B23K 2201/32; B23K 2201/38; H02K 3/50

See application file for complete search history.

(56) References Cited

U.S. PATENT DOCUMENTS

| | | | | |
|---|---|---|---|---|
| 4,551,488 | A  * | 11/1985 | Leech ................. | B23K 35/224 |
| | | | | 428/901 |
| 9,166,452 | B1* | 10/2015 | Endo .................. | G11B 19/2009 |
| 2002/0179690 | A1* | 12/2002 | Kawashima .......... | B23K 1/203 |
| | | | | 228/207 |
| 2002/0179693 | A1* | 12/2002 | Kawashima ......... | B23K 1/0016 |
| | | | | 228/232 |
| 2009/0127964 | A1* | 5/2009 | Yumoto ................ | H02K 3/522 |
| | | | | 310/195 |

FOREIGN PATENT DOCUMENTS

| | | |
|---|---|---|
| JP | 170383 U | 5/1989 |
| JP | 1168289 A | 3/1999 |

(Continued)

OTHER PUBLICATIONS

English Abstract and Machine Translation for Japanese Publication No. 2011-258590 A, published Dec. 22, 2011, 33 pgs.

(Continued)

*Primary Examiner* — Naishadh Desai

(74) *Attorney, Agent, or Firm* — Fredrikson & Byron, P.A.

(57) ABSTRACT

The present invention provides a substrate provided with a land to which the tip of a magnetic wire is to be soldered and a resin wall formed around and higher than the land. The resin wall has an inclined surface inclined at an angle greater than 90° with respect to the land.

5 Claims, 4 Drawing Sheets

(56) References Cited

FOREIGN PATENT DOCUMENTS

| JP | 200215624 A | 1/2002 |
|---|---|---|
| JP | 2003154450 A | 5/2003 |
| JP | 2011258590 A | 12/2011 |

OTHER PUBLICATIONS

English Abstract and Machine Translation for Japanese Publication No. 2002-015624 A, published Jan. 18, 2002, 9 pgs.
English Abstract and Machine Translation for Japanese Publication No. JPH0170383 U, published May 10, 1989, 3 pgs.
English Abstract and Machine Translation for Japanese Publication No. 11-068289 A, published Mar. 9, 1999, 13 pgs.
English Abstract and Machine Translation for Japanese Publication No. 2003-154450 A, published May 27, 2003, 8 pgs.
Untranslated Decision to Grant a Patent mailed by Japan Patent Office (JPO) for Application No. JP 2015-041792, dated Sep. 12, 2017, 3 pages.
English machine translation of Decision to Grant a Patent mailed by Japan Patent Office (JPO) for Application No. JP 2015-041792, dated Sep. 12, 2017, 3 pages.
Untranslated Decision of Refusal mailed by Japan Patent Office (JPO) for Application No. JP 2015-041792, dated Mar. 23, 2017, 4 pages.
English machine translation Decision of Refusal mailed by Japan Patent Office (JPO) for Application No. JP 2015-041792, dated Mar. 23, 2017, 4 pages.

\* cited by examiner

SUBSTRATE MANUFACTURED FROM SHEET METAL AND RESIN, MOTOR PROVIDED WITH SUBSTRATE, AND SOLDERING METHOD THEREFOR

BACKGROUND OF THE INVENTION

1. Field of the Invention

The present invention relates to a substrate manufactured from sheet metal and a resin. Specifically, the present invention relates to a substrate provided with a wiring pattern and a land for soldering wire thereon. Further, the present invention relates to a motor provided with the substrate and a soldering method for connecting the tip of the wire to the land of the substrate.

2. Description of the Related Art

Japanese Patent Laid-Open No. 11-68289 discloses one method for automatically soldering the tip of a wire to the land of a substrate by flow soldering. Flow soldering is a method of connecting the wire to the land of a substrate by immersing the surface of the substrate provided with the land into a solder bath of molten solder. However, if the substrate is made of a resin, the heat resistance of the resin may result in that the substrate cannot be immersed in the solder bath. In such cases, in order to prevent the deformation of the substrate due to heat; it is necessary to solder a wire onto each land. Accordingly, a method of, for example, attaching a soldering iron to a robot hand, moving the tip of the soldering iron to each of the lands on the substrate, and soldering the tip of the wire to each land is adopted.

FIG. 7 is a top view of a conventional substrate, and FIG. 8 is a cross-section of the substrate taken along the line X-X' in FIG. 7.

When manufacturing a substrate having lands thereon, a resin is integrally molded with a sheet metal such that a portion of the sheet metal does not have the resin molding carried out thereon, thereby remaining exposed. Consequently, as illustrated in FIGS. 7 and 8, the exposed surface of the sheet metal 11 is used as the land 13. In this case, a resin wall 12 perpendicular to the land 13 is formed around the land 13 to which a wire 14 is to be soldered. In a substrate 15 provided with the land 13 shaped as such, as described above, when moving the tip of a soldering iron to the land 13 by a robot, there is a risk that the tip of the soldering iron may contact the resin wall 12 around the land 13 resulting in damage to the resin wall 12.

This problem occurs, when the tip of the soldering iron is not accurately moved to the center of the land and may be caused by, for example, misalignment of the substrate to be soldered, or teaching an inaccurate target position to the robot, etc. This problem becomes more pronounced the smaller the surface area of the land.

Further, as a method of soldering without the use of a soldering iron, a laser may be used (hereinafter referred to as laser soldering). In laser soldering, a laser beam can be focused onto a small spot, thus it is possible to solder a land with a small surface area. However, when laser soldering is carried out on the land 13 of the substrate 15, illustrated in FIGS. 7 and 8, there is a problem that diffuse reflection of the laser beam from the land 13 may irradiate the resin wall 12 surrounding the land 13, melting the resin wall 12, and when the laser beam is impinged upon the wire 14 to be soldered, diffuse reflection of the laser beam may occur and cause the resin wall 12 to melt. This problem becomes more pronounced the smaller the surface area of the land.

It is desirable for the resin surrounding the land to be resistant to damage by diffuse reflection of a laser beam, and for the area which is soldered in order to suppress diffuse reflection of a laser beam, when a resin molded substrate is laser soldered.

SUMMARY OF INVENTION

The present invention provides a substrate provided with a land surrounded by a resin wall, wherein the soldering of a wire to the land can be carried out without damage to the resin wall surrounding the land.

According to a first aspect of the present invention, there is provided a substrate comprising a land to which a tip of a wire is to be soldered, and a resin wall formed higher than the land and formed around the land, wherein the wall comprises an inclined surface, inclined at an angle greater than 90° with respect to the land.

According to a second aspect of the present invention, there is provided the substrate according to the first aspect of the invention wherein the wall has a color with a reflectance of not less than 60%.

According to the third aspect of the present invention, there is provided the substrate according to the first aspect of the invention wherein a groove to house the tip of the wire is formed in the wall.

According to the fourth aspect of the present invention, there is provided the substrate according to the third aspect of the invention wherein the groove is positioned on a line at an angle from the center line of the land.

According to the fifth aspect of the present invention, there is provided the substrate according to the third aspect of the invention wherein the bottom surface of the groove is positioned higher than the land.

According to the sixth aspect of the present invention, there is provided a motor comprising the substrate according to any one of the first to fifth aspects of the invention, and a stator comprising a magnetic wire, wherein the tip of the magnetic wire is soldered to the land of the substrate.

According to the seventh aspect of the present invention, there is provided a soldering method comprising:
preparing a substrate comprising a land to which a tip of a wire is to be soldered and a resin wall which surrounds the land and is formed higher than the land, wherein the wall comprises an inclined surface, inclined at an angle greater than 90° with respect to the land;
positioning the tip of the wire on the land of the substrate; and
soldering the tip of the wire to the land by a soldering iron or laser.

According to the eighth aspect of the present invention, there is provided the soldering method according to the seventh aspect of the invention further comprising forming a groove which houses the tip of the wire in the wall; and housing the tip of the wire into the groove and securing the position of the wire on the land when the tip of the wire is positioned on the land.

BRIEF DESCRIPTION OF THE DRAWINGS

The above mentioned objects, features, and advantages and other objects, features and advantages of the present invention will become more apparent from the following detailed description of the exemplary embodiments of the present invention illustrated in the accompanying drawings in which:

FIG. 1b is a schematic cross-sectional view of the motor illustrated in FIG. 1a.

DETAILED DESCRIPTION

Hereinafter, embodiments of the present invention will be described with reference to the drawings.

Figure 1A:
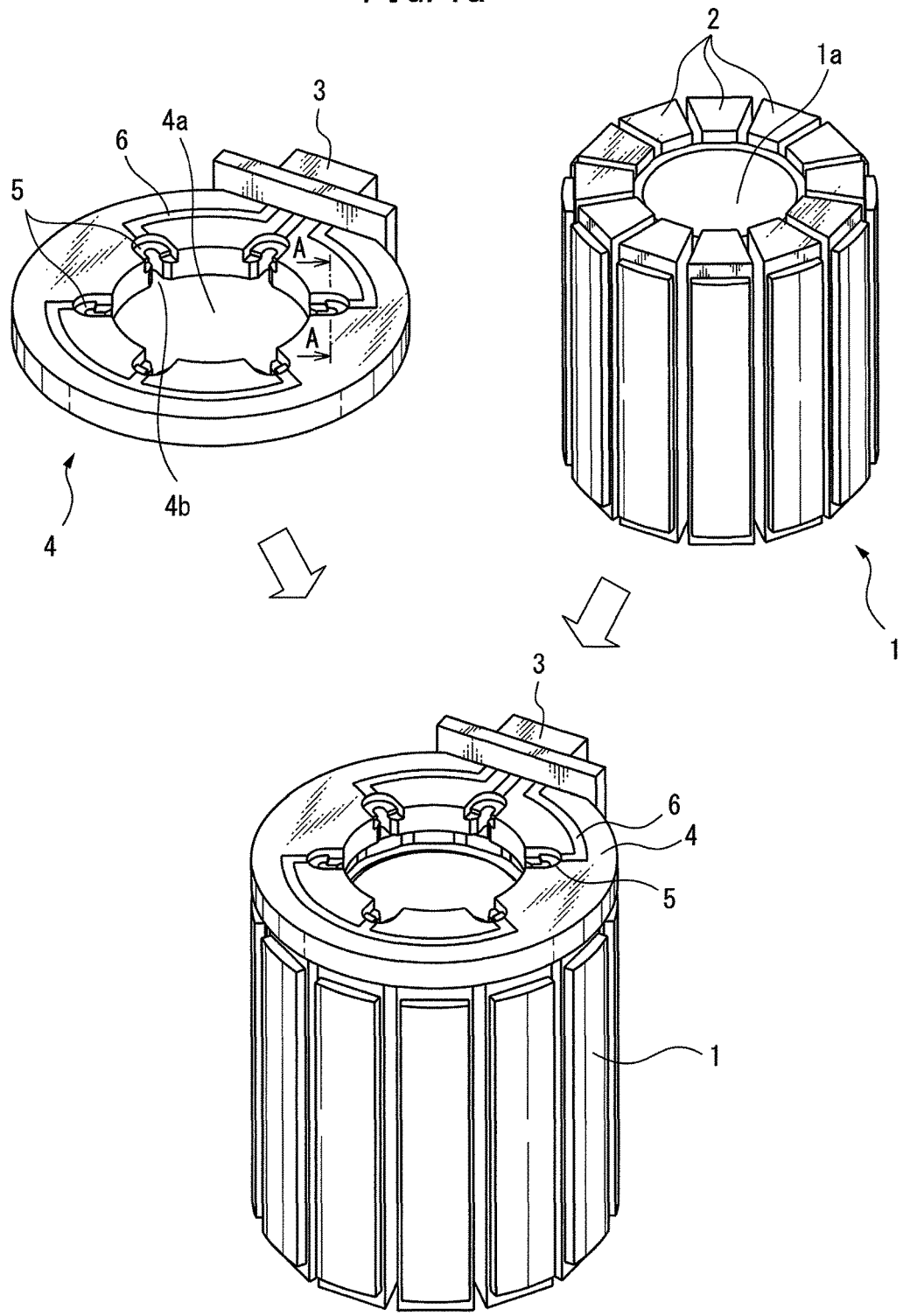
FIG. 1a is an exploded perspective view of a stator of a motor of one embodiment of the present invention.
Figure 1B:
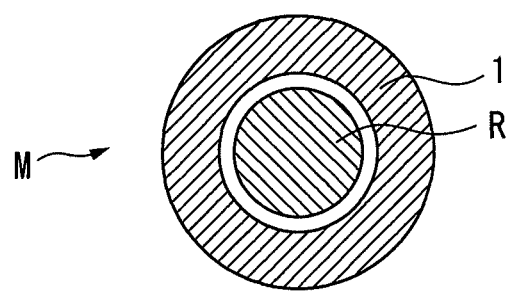

FIG. 1a is an exploded perspective view of a stator of a motor of one embodiment of the present invention, FIG. 1b is a schematic cross-section of the motor illustrated in FIG. 1a. The motor M of the present embodiment is composed of a rotor R, a stator 1 applying magnetic rotational force to the rotor R, and a substrate 4 which electrically connects magnetic wires 2 of the stator 1 and a connector 3.

The stator 1 is substantially in the form of a hollow cylinder and the substrate 4 is formed in an annular shape to correspond thereto. The substrate 4 is, as shown in FIG. 1a, attached onto the stator 1 such that the rotor R can be inserted into a hollow portion 1a of a stator 1 through an opening 4a of the substrate 4.

A plurality of lands 5 are arranged along the rim of the opening 4a on the top surface of the substrate 4 and the connector 3 is attached to the circumferential edge of the substrate 4. A plurality of wiring patterns 6 are formed extending to each of the lands 5 from the connector 3 on the top surface of the substrate 4, thereby each of the lands 5 is electrically connected to the connector 3.

Furthermore, the substrate 4 is made of a sheet metal 10 with which resin is integrally molded, and the lands 5 are defined by surface portions of the sheet metal 10 which have been exposed by the removal of resin from the sheet metal. Thus, each of the lands 5 are positioned lower than the top surface of the substrate 4 on which are formed the wiring patterns 6. According to the present embodiment, a resin wall 7 exists around the circumference of each land 5 excluding the side adjacent to the opening 4a of the substrate 4. Note that, the invention can be applied to any substrate provided with a metal layer and a resin layer laminated thereon regardless of the manufacturing method of the substrate.

The tip of the magnetic wire 2 is soldered to the land 5 constructed as above. Specifically, the magnetic wire 2 is extended from the stator 1 located beneath the substrate 4 onto the substrate 4 through the opening 4a of the substrate 4 and the tip of the magnetic wire 2 is soldered onto the land 5 of the substrate 4. At this time, in order to reliably guide the tip of the magnetic wire 2 from the stator 1 to the land 5, it is preferable that a cut-away portion 4b be formed in the inside surface of the opening 4a of the substrate 4.

The soldering process as described above can be automated, for example, by attaching a laser or a soldering iron to a robot hand, moving the laser or the tip of the soldering iron to each of the lands 5 of the substrate 4 by the robot, and soldering the tip of the magnetic wire 2 to each of the lands 5.

Furthermore, when carrying out the soldering process as described above, it is preferable that the peripheral part of the land 5 be configured as disclosed in the following embodiments.

First Embodiment

Figure 2:
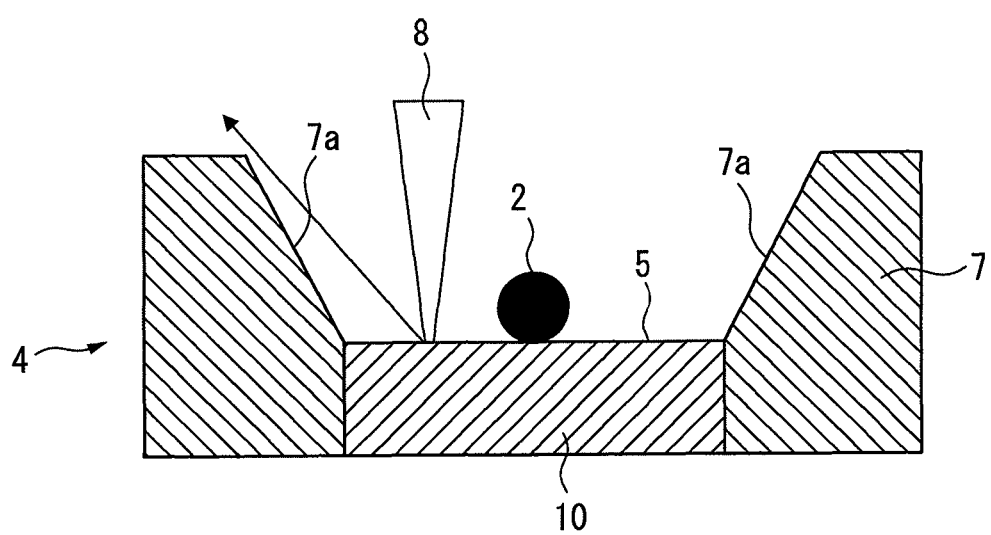
FIG. 2 is a sectional view of the substrate of the first embodiment.

FIG. 2 is a sectional view of the substrate 4 of the first embodiment. Specifically, FIG. 2 corresponds to a partial cross-section of the substrate taken along the line A-A' in FIG. 1a.

In the first embodiment, as illustrated in FIG. 2, a resin wall 7 which surrounds the land 5 has an inclined surface 7a, inclined at an angle greater than 90° with respect to the land 5. Such a configuration makes it less likely for the laser beam 8 to impinge upon the resin wall 7 when reflected from the land 5 during laser soldering of the tip of the magnetic wire 2 to the land 5 as shown in FIG. 2. Namely, melting of the resin wall 7 of the substrate 4 during laser soldering can be prevented.

Figure 7:
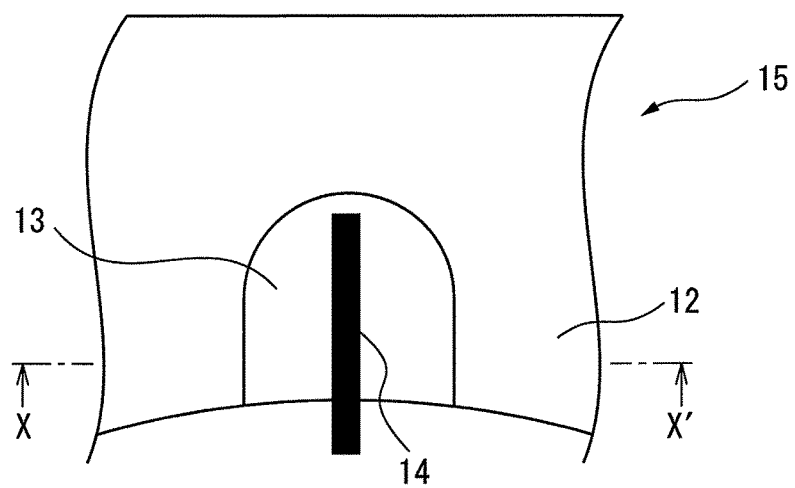
FIG. 7 is a top view of a conventional substrate.
Figure 8:
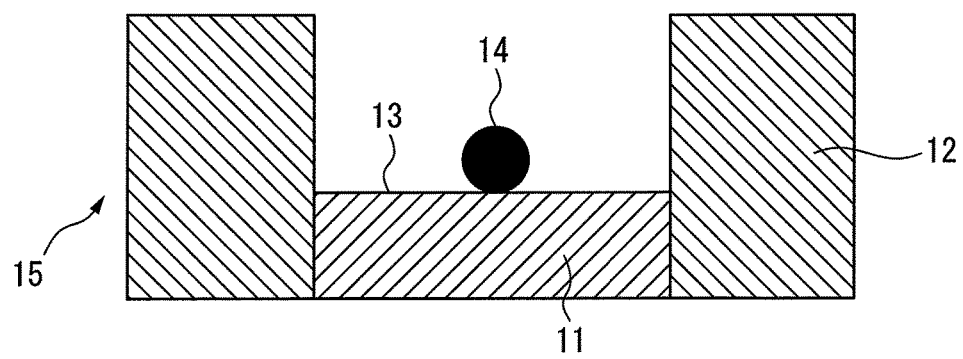
FIG. 8 is a sectional view of the substrate taken along the line X-X' in FIG. 7.

In contrast to the above configuration, as illustrated in FIGS. 7 and 8, if the resin wall 12 surrounding the land 13 is perpendicular to the land 13, the wall 12 directly receives the energy due to diffuse reflection of the laser beam from the land 13, thus the resin wall 12 tends to be melted.

Second Embodiment

In the second embodiment, the resin wall 7 of the first embodiment illustrated in FIG. 2 is made of a resin material having a highly reflective color (for example white or a lustrous metallic color etc.). It is preferable for the reflectance of the color of the resin wall 7 to be not less than 60%. In other words, the resin wall 7 in the present embodiment has a color with a low absorptivity.

Even if the laser beam 8 reflected from the land 5 hits the resin wall 7 during laser soldering of the tip of the magnetic wire 2 to the land 5, the use of such a resin wall 7 results in the resin wall 7 being less likely to melt.

The second embodiment can effectively prevent the melting of the resin wall 7 of the substrate 4 during laser soldering, to a greater extent than the first embodiment.

Moreover, in the second embodiment, the whole of the resin wall 7 has a highly reflective color; however, the inclined surface 7a of the resin wall 7 may be coated with a highly reflective color to obtain the aforementioned effect.

The third to fifth embodiments are described below as examples of configurations which can further improve the effects of the first and second embodiments.

Third Embodiment

Figure 3:
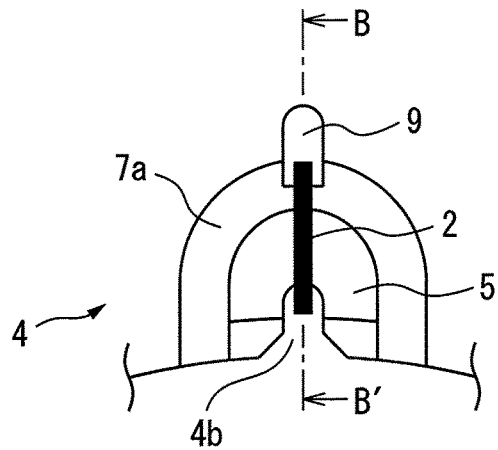
FIG. 3 is a top view of the substrate of the third embodiment.

FIG. 3 is a top view of the substrate 4 of the third embodiment. Specifically, FIG. 3 illustrates the peripheral part of the land 5 of the substrate 4.

As illustrated in FIG. 3, the magnetic wire 2 is guided and extended from beneath the substrate 4 to the top of the substrate 4 through the cut-away portion 4b. And the tip of the magnetic wire 2 is placed on the land 5 of the substrate 4. At this time, as the tip of the magnetic wire 2 tends to be deformed, the position thereof on the land 5 is not secured. Accordingly, during laser soldering of each of the lands 5 by a robot, the magnetic wire 2 may be present at the position irradiated by the laser beam, which results in the diffuse reflection of the laser beam.

Accordingly, in the third embodiment, a groove 9 for housing and holding the tip 2a of the magnetic wire 2 is formed in the resin wall 7 surrounding the circumference of the land 5. By providing the groove 9 as such, the position of the magnetic wire 2 on the land 5 can be secured. Thus, the irradiation position of the laser beam onto each land 5 can be set constant. Namely, when laser soldering for each of the lands 5 by the robot, the laser beam can be irradiated onto the portion of the land 5 where the magnetic wire 2 is not present.

Fourth Embodiment

Figure 4:
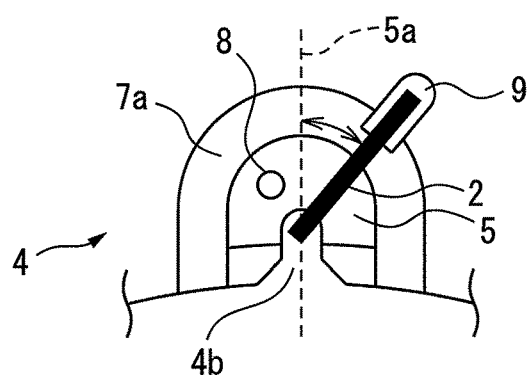
FIG. 4 is a top view of the substrate of the fourth embodiment.

FIG. 4 is a top view of the substrate of the fourth embodiment. Specifically, FIG. 4 illustrates the peripheral part of the land 5 of the substrate 4.

As illustrated in FIG. 4, in the fourth embodiment, the position of the groove 9 is modified with respect to the third embodiment. To elaborate, in the third embodiment, the cut-away portion 4b and the groove 9 formed in the substrate 4 are arranged on the center line 5a of the land 5, i.e., on a line which divides the surface area of the land 5 equally in two. Compared to that, in the fourth embodiment, the groove 9 is positioned on a line, at an angle from the center line 5a of the land 5.

When the tip 2a of the magnetic wire 2 is secured to the groove 9, the land 5 is divided into two regions with the magnetic wire 2 as the boundary. In the third embodiment, the surface areas of the two regions are equal; however, in the fourth embodiment, the surface areas of the two regions of the land 5 with the magnetic wire 2 as the boundary are different from each other. Namely, as shown in FIG. 4, the surface area on which the laser beam 8 is irradiated can be widened. Accordingly, compared to the third embodiment, the probability of the laser beam being diffusely reflected during laser soldering can be reduced.

Fifth Embodiment

Figure 5:
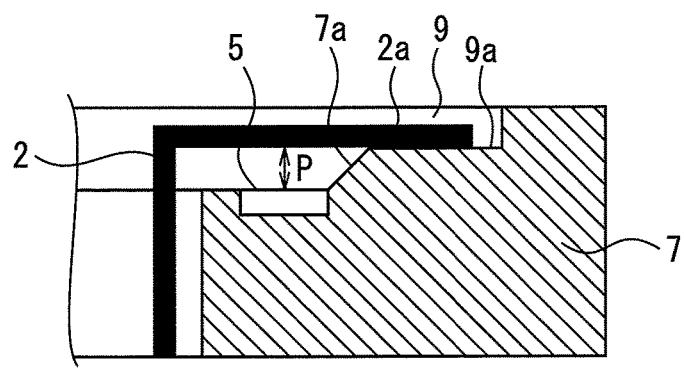
FIG. 5 is a sectional view of the substrate of the fifth embodiment.

FIG. 5 is a sectional view of the substrate of the fifth embodiment. Specifically, FIG. 5 corresponds to a partial cross-section of the substrate 4 taken along the line B-B' in FIG. 3.

In the above embodiments, if the magnetic wire 2 contacts the land 5 when the magnetic wire 2 is soldered onto the land 5, wet spreading of the solder is obstructed by the magnetic wire 2.

Accordingly, in the fifth embodiment, the bottom surface 9a of the groove 9 as described above in the third and fourth embodiments is provided in a position higher than the land 5 as illustrated in FIG. 5. By providing the bottom surface 9a of the groove 9 in such a position, a gap P is formed between the land 5 and the magnetic wire 2 secured in the groove 9. The gap P provides a path for the solder, thus the wet spreading of the solder on the land 5 is facilitated.

Another Embodiment

The above-mentioned embodiments describe cases where the land 5 and the magnetic wire 2 are connected by laser soldering. However, the substrate of the present invention is also useful in cases when a soldering iron is attached to a robot hand and moved to each of the lands 5.

Figure 6:
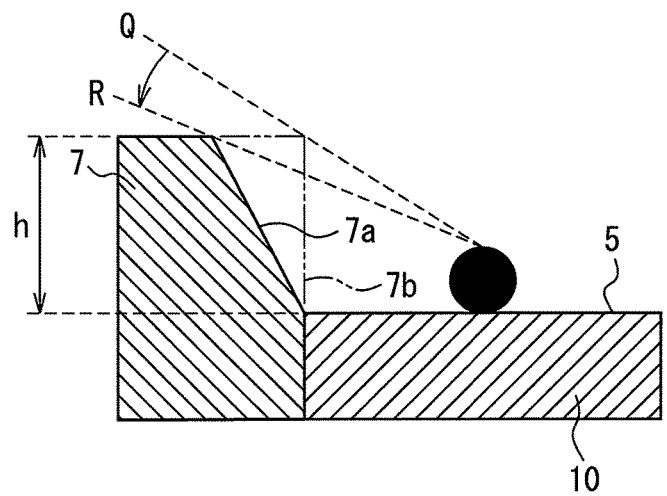
FIG. 6 is a schematic cross-sectional view of the substrate, for the purpose of describing another embodiment.

Namely, as shown by the dashed and double-dotted line in FIG. 6, if the resin wall 7 surrounding the circumference of the land 5 is perpendicular to the land 5, the tip of the soldering iron (not illustrated) will touch the resin wall 7 if positioned below the dotted line Q. However, when the resin wall 7 is formed with an inclined surface 7a, inclined at an angle greater than 90° with respect to the land 5, as shown by the solid line in FIG. 6, and the height h of the resin wall 7 is the same as that of the perpendicular side wall 7b as shown by the dashed and double-dotted line, the area in which the tip of the soldering iron (not illustrated) does not touch the resin wall 7 increases from the dotted line Q to the dotted line R therebelow. Therefore, increasing the angle of inclination of the resin wall 7 to a value greater than 90° with respect to the land 5 is also advantageous in the case of soldering by a robot to which a soldering iron is attached. Note that, since the resin wall 7 is formed higher than the land 5, the upper limit of the angle of the inclined surfaces 7a with respect to the land 5 should be less than 180°.

The embodiments of the present invention have been illustrated in the above embodiments 1 to 5. However, the present invention is not limited thereto, and without departing from the ideas of the present invention, the shape, configuration and materials etc. of each of the embodiments may be modified.

Further, the above explanation has been directed to a substrate (circuit board) wherein the magnetic wire of a stator used in a motor is electrically connected to a connector by way of example. However, the applicability of the substrate of the present invention is not limited to a motor, the substrate of the present invention can be applied to a variety of electrical devices which require a substrate for electrical connection.

Effects of the Invention

According to one embodiment of the present invention, the resin wall surrounding the circumference of the land has an inclined surface inclined at an angle greater than 90° with respect to the land a laser beam reflected from the land does not impinge on the resin wall when laser soldering is carried out on the tip of the wire positioned on the land. Further, when a soldering iron is attached to a robot hand and used to solder the tip of the wire positioned on the land, the tip of the soldering iron does not collide with the resin wall surrounding the land.

According to the above, in a substrate provided with a land surrounded by a resin wall, it is possible to solder the tip of a wire to the land without damaging the resin wall surrounding the land.

Furthermore, according to another embodiment of the present invention, even if the reflected laser beam irradiates the resin, the melting of the resin can be prevented so that the resin wall has a color with a reflectance of not less than 60%.

According to another embodiment of the present invention, the tip of the wire is housed in a groove formed in the resin wall, thus the wire can be secured so that the wire is not present in the irradiating area during soldering. Therefore, diffuse reflection resulting from the laser beam impinging upon the wire can be reduced.

According to another embodiment, the region where the laser beam irradiates the land is increased by positioning the aforementioned groove on a line at an arbitrary angle from the center line of the land during soldering, thus the diffuse reflection resulting from the laser beam impinging upon the wire can be reduced.

According to another embodiment, since the bottom surface of the groove which houses the tip of the wire is formed in a position higher than the land, a gap is formed between the wire and the land, thereby wet spreading of the solder is facilitated.

According to another embodiment, a motor equipped with a substrate which is subjected to the soldering which brings about effects as described above is provided.

What is claimed is:

1. A substrate comprising:
   a land to which a tip of a wire is to be soldered; and
   a resin wall formed higher than the land and formed around the land, wherein the wall comprises an inclined surface, inclined at an angle greater than 90° with respect to the land, wherein the wall has a white color or a metallic color, and wherein a groove to house the tip of the wire is formed in the wall.

2. The substrate according to claim 1, wherein the groove is positioned on a line at an angle from a center line of the land.

3. The substrate according to claim 1, wherein a bottom surface of the groove is positioned higher than the land.

4. A motor comprising the substrate of claim 1 and a stator comprising a magnetic wire, wherein the tip of the magnetic wire is soldered to the land of the substrate.

5. A soldering method comprising:
   preparing a substrate comprising a land to which a tip of a wire is to be soldered and a resin wall which surrounds the land and is formed higher than the land, wherein the wall comprises an inclined surface, inclined at an angle greater than 90° with respect to the land;
   positioning the tip of the wire on the land of the substrate; and
   soldering the tip of the wire to the land by a soldering iron or laser,
   wherein a groove which houses the tip of the wire is formed in the wall, the soldering method further comprising housing the tip of the wire into the groove and securing the position of the wire on the land when the tip of the wire is positioned on the land.

* * * * *